(12) United States Patent
Subramaniyan et al.

(10) Patent No.: US 10,488,279 B2
(45) Date of Patent: Nov. 26, 2019

(54) COMPONENTS CONFIGURED TO AUTONOMOUSLY DETECT AND ACCOMMODATE STRUCTURAL CHANGES

(71) Applicant: GENERAL ELECTRIC COMPANY, Schenectady, NY (US)

(72) Inventors: Arun Karthi Subramaniyan, Danville, CA (US); Ananda Barua, Schenectady, NY (US); Daniel J. Erno, Clifton Park, NY (US); Darren L. Hallman, Scotia, NY (US); Changjie Sun, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 15/667,091

(22) Filed: Aug. 2, 2017

(65) Prior Publication Data

US 2019/0041280 A1   Feb. 7, 2019

(51) Int. Cl.
*G01M 5/00* (2006.01)
*G01N 27/20* (2006.01)
(Continued)

(52) U.S. Cl.
CPC .............. *G01L 1/14* (2013.01); *B22F 3/1055* (2013.01); *B22F 5/10* (2013.01); *B33Y 80/00* (2014.12);
(Continued)

(58) Field of Classification Search
CPC ....... E04H 12/34; E04H 12/342; E04H 12/10; F03D 13/20; F03D 13/10; F05B 2230/60;
(Continued)

(56) References Cited

U.S. PATENT DOCUMENTS 4,503,710 A   3/1985   Oertle et al.
5,209,126 A * 5/1993   Grahn .................... G01L 1/247
                                                73/862.046
(Continued)

FOREIGN PATENT DOCUMENTS

CN    102621281 A    8/2012
CN    202471643 U   10/2012
(Continued)

OTHER PUBLICATIONS

Sloth et al., "Active and passive fault-tolerant LPV control of wind turbines", American Control Conference (ACC), pp. 4640-4646, 2010.
(Continued)

*Primary Examiner* — Brandi N Hopkins
(74) *Attorney, Agent, or Firm* — Armstrong Teasdale LLP

(57) ABSTRACT

A component has a first structural configuration and a second structural configuration. The component includes a sensor assembly including a plurality of interconnected structural members defining a plurality of load paths. A first structural member and a second structural member define a first load path when the component is in the first structural configuration. The first structural member and a third structural member define a second load path when the component is in the second structural configuration. The second load path is configured to bypass the second structural member. The sensor assembly is configured to detect a characteristic of the component that changes when the component switches between the first structural configuration and the second structural configuration.

23 Claims, 4 Drawing Sheets

(51) Int. Cl.
*G01B 7/16* (2006.01)
*G01L 1/14* (2006.01)
*G01L 1/20* (2006.01)
*B22F 5/10* (2006.01)
*F01D 5/28* (2006.01)
*F01D 21/14* (2006.01)
*F01D 17/02* (2006.01)
*B22F 3/105* (2006.01)
*B33Y 80/00* (2015.01)
*F01D 25/00* (2006.01)
*F03D 17/00* (2016.01)
*F01D 21/00* (2006.01)
*B22F 5/04* (2006.01)

(52) U.S. Cl.
CPC .............. *F01D 5/28* (2013.01); *F01D 5/282* (2013.01); *F01D 5/284* (2013.01); *F01D 17/02* (2013.01); *F01D 21/14* (2013.01); *F01D 25/005* (2013.01); *G01L 1/146* (2013.01); *G01L 1/20* (2013.01); *G01L 1/205* (2013.01); *B22F 5/04* (2013.01); *F01D 21/003* (2013.01); *F03D 17/00* (2016.05); *F05B 2230/30* (2013.01); *F05B 2270/80* (2013.01); *F05B 2270/808* (2013.01); *F05D 2230/30* (2013.01); *F05D 2260/80* (2013.01); *F05D 2270/331* (2013.01)

(58) Field of Classification Search
CPC .......... F05B 2240/3121; Y02E 10/721; Y02E 10/728; Y02P 70/523; G01M 5/0033; G01M 5/0083; G01N 2203/0064; G01N 2203/0629; G01N 27/205; G01L 1/247; G01L 5/16; G01L 5/167; G01L 1/255; G01L 5/166; G01L 5/228; G01B 7/18
See application file for complete search history.

(56) References Cited

U.S. PATENT DOCUMENTS

| | | | | |
|---|---|---|---|---|
| 6,986,287 | B1* | 1/2006 | Dorfman | G01B 7/18 73/776 |
| 7,017,421 | B2* | 3/2006 | Kehlenbach | G01L 1/165 73/800 |
| 7,106,215 | B2* | 9/2006 | Marishak, Jr. | G01M 3/16 324/526 |
| 7,921,727 | B2 | 4/2011 | Rice et al. | |
| 8,684,595 | B2* | 4/2014 | Wardle | B82Y 15/00 374/45 |
| 2004/0247163 | A1 | 12/2004 | Hara | |
| 2005/0145045 | A1* | 7/2005 | Papakostas | G01L 1/20 73/864 |
| 2005/0228597 | A1* | 10/2005 | Giurgiutiu | G01M 5/0033 702/35 |
| 2005/0284232 | A1* | 12/2005 | Rice | G01B 7/18 73/762 |
| 2006/0055415 | A1 | 3/2006 | Takita | |
| 2012/0048028 | A1 | 3/2012 | Miyajima et al. | |
| 2012/0253697 | A1* | 10/2012 | Frankenstein | G05B 23/0254 702/39 |
| 2013/0075237 | A1 | 3/2013 | Gutierrez | |
| 2016/0177744 | A1 | 6/2016 | Benson et al. | |

FOREIGN PATENT DOCUMENTS

| | | |
|---|---|---|
| CN | 203962299 U | 11/2014 |
| CN | 103994032 B | 10/2016 |
| KR | 10-2015-0092668 A | 8/2015 |

OTHER PUBLICATIONS

International Search Report and Written Opinion issued in connection with corresponding PCT Application No. PCT/US2018/040270 dated Nov. 14, 2018.

* cited by examiner

COMPONENTS CONFIGURED TO AUTONOMOUSLY DETECT AND ACCOMMODATE STRUCTURAL CHANGES

BACKGROUND

The field of the disclosure relates generally to structures and, more particularly, to structures including components configured to autonomously detect and accommodate structural changes.

Known components are incorporated into structures and are configured to carry loads during operation of the structures. Sometimes components experience a structural change which disrupts load paths through the components. Such structural changes generate areas of increased stress in the components, which reduce the expected service life of the components. In addition, sometimes cracks and other structural weaknesses translate along the load paths after a structural change. Accordingly, it is desirable to detect when structural changes occur in components to reduce areas of increased stress and to inhibit expansion of structural weaknesses. However, it is difficult to detect structural changes in at least some known components such as components manufactured using an additive manufacturing process.

BRIEF DESCRIPTION

In one aspect, a component having a first structural configuration and a second structural configuration is provided. The component includes sensor assembly including a plurality of interconnected structural members defining a plurality of load paths. The plurality of interconnected structural members includes a first structural member and a second structural member coupled to the first structural member. The first structural member and the second structural member define a first load path when the component is in the first structural configuration. The plurality of interconnected structural members also includes a third structural member coupled to the first structural member. The first structural member and the third structural member define a second load path when the component is in the second structural configuration. The second load path is configured to bypass the second structural member. The sensor assembly is configured to detect a characteristic of the component that changes when the component switches between the first structural configuration and the second structural configuration.

In another aspect, a method of detecting a structural change in a component is provided. The component includes a plurality of interconnected structural members defining a plurality of load paths. The method includes providing a sensor assembly including the plurality of interconnected structural members, a first terminal coupled to the plurality of interconnected structural members, and a second terminal coupled to the plurality of interconnected structural members. The second terminal is spaced from the first terminal. The method also includes directing an electrical current through the component between the first terminal and the second terminal. The method further includes determining, using the sensor assembly, a first characteristic along a first load path between the first terminal and the second terminal. At least one structural member of the plurality of structural members at least partially defines the first load path. The method also includes determining, using the sensor assembly, a second characteristic along a second load path between the first terminal and the second terminal. The second load path allows a load to bypass the at least one structural member of the plurality of structural members.

In another aspect, a component is provided. The component includes a first set of structural members defining a first region of the component. The component includes a second set of structural members defining a second region of the component. The component has a first structural configuration in which the second set of structural members are coupled to the first set of structural members, and a second structural configuration in which the second region is at least partially separated from the first region. The first set of structural members and the second set of structural members define a first load path when the component is in the first structural configuration. The first set of structural members defines a second load path when the component is in the second structural configuration. The second load path is configured to allow a structural load to bypass the second region.

DRAWINGS

These and other features, aspects, and advantages of the present disclosure will become better understood when the following detailed description is read with reference to the accompanying drawings in which like characters represent like parts throughout the drawings, wherein.

Figure 1:
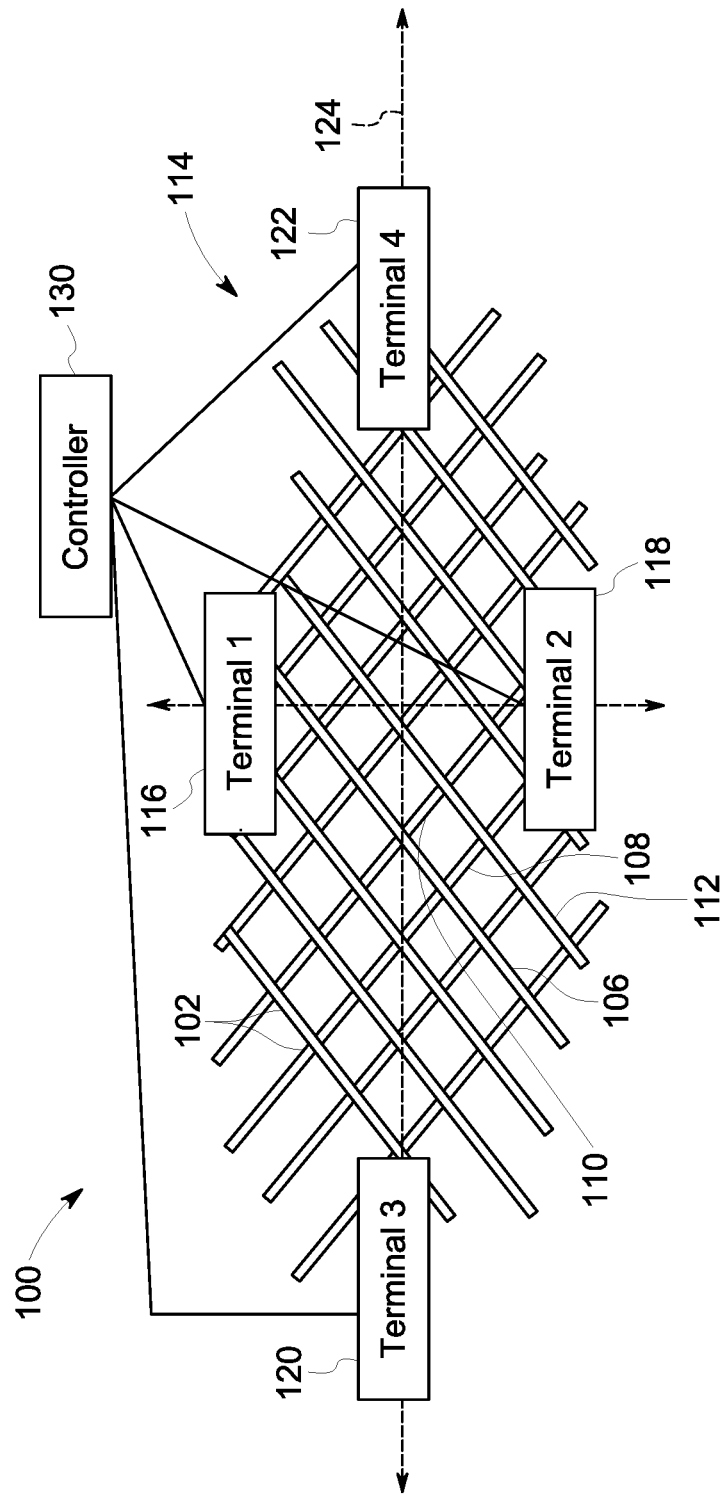
FIG. 1 is a schematic illustration of an exemplary component including a plurality of interconnected structural members.

Unless otherwise indicated, the drawings provided herein are meant to illustrate key inventive features of the disclosure. These key inventive features are believed to be applicable in a wide variety of systems comprising one or more embodiments of the disclosure. As such, the drawings are not meant to include all conventional features known by those of ordinary skill in the art to be required for the practice of the disclosure.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), a programmable logic unit (PLU), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The methods and systems described herein facilitate detection of structural changes to components and reduce the structural effects of such changes. For example, some embodiments include a component including a plurality of interconnected structural members that define a plurality of load paths through the component. The structural members enable loads to travel along the different load paths and bypass at least some structural members. As a result, the structural members facilitate the isolation of portions of the component when the component experiences structural changes. In addition, in some embodiments, the component is used as a sensor to detect structural changes. Moreover, in some embodiments, the structural members form at least one region that separates from the remainder of the component and allows the component to maintain structural integrity when the component experiences structural changes.

FIG. 1 is a schematic view of a component 100 including a plurality of interconnected structural members 102. In the exemplary embodiment, component 100 is configured to carry a load. In some embodiments, component 100 is incorporated into a structure and carries a load during operation of the structure. For example, in some embodiments, component 100 is used for an airfoil, a rotary machine such as a turbomachine and/or a wind turbine, and/or any other structure.

In the exemplary embodiment, structural members 102 include, for example and without limitation, a first structural member 106, a second structural member 108, a third structural member 110, and a fourth structural member 112. First structural member 106, second structural member 108, third structural member 110, and fourth structural member 112 are coupled together and are configured to support loads. In the exemplary embodiment, structural members 102 are interconnected and form a lattice structure. For example, in the exemplary embodiment, at least one structural member 102 is coupled to a plurality of other structural members 102. In addition, in some embodiments, structural members 102 are arranged in a non-uniform pattern. In alternative embodiments, component 100 includes any structural members 102 that enable component 100 to function as described herein. For example, in some embodiments, structural members 102 form a plurality of unit cells arranged in a nested pattern.

Also, in the exemplary embodiment, component 100 includes a sensor assembly 114 including structural members 102, a first terminal 116, a second terminal 118, a third terminal 120, and a fourth terminal 122. Structural members 102 extend between first terminal 116, second terminal 118, third terminal 120, and fourth terminal 122 in a longitudinal direction 124 and a transverse direction 126. Transverse direction 126 is perpendicular to longitudinal direction 124. In the exemplary embodiment, structural members 102 have different orientations. For example, at least some structural members 102 are angled relative to transverse direction 126 and longitudinal direction 124. In addition, in some embodiments, structural members 102 are arranged in a non-uniform pattern. In alternative embodiments, structural members 102 have any orientation that enables component 100 to function as described herein.

Moreover, in the exemplary embodiment, first terminal 116 is aligned with second terminal 118 in longitudinal direction 124 and is spaced from second terminal in transverse direction 126. Third terminal 120 is aligned with fourth terminal 122 in transverse direction 126 and is spaced from fourth terminal 122 in longitudinal direction 124. In alternative embodiments, terminals 116, 118, 120, 122 are positioned in any manner that enables component 100 to function as described herein. For example, in some embodiments, terminals 116, 118, 120, 122 are positioned randomly throughout component 100. In further embodiments, at least some terminals 116, 118, 120, 122 are positioned at boundaries of component 100.

Moreover, in the exemplary embodiment, sensor assembly 114 is incorporated into component 100 such that component 100 acts a sensor to detect structural changes.

For example, first terminal 116, second terminal 118, third terminal 120, and fourth terminal 122 are coupled directly to structural members 102 such that structural members 102 facilitate detection of a characteristic of component 100. In the exemplary embodiment, a characteristic of component 100 such as capacitance and/or resistance is used to detect structural changes. In some embodiments, sensor assembly 114 is configured for passive and/or active detection. In alternative embodiments, sensor assembly 114 has any configuration that enables component 100 to function as described herein.

In addition, in the exemplary embodiment, first terminal 116, second terminal 118, third terminal 120, and fourth terminal 122 are configured to enable measurement of the characteristic of component 100. Specifically, in the exemplary embodiment, first terminal 116, second terminal 118, third terminal 120, and fourth terminal 122 are used to measure capacitance and/or resistance of component 100. During operation of sensor assembly 114, at least one of first terminal 116, second terminal 118, third terminal 120, and fourth terminal 122 is configured to provide an electrical current to facilitate the determination of the capacitance and/or resistance of a portion of component 100. In addition, in some embodiments, at least one of first terminal 116, second terminal 118, third terminal 120, and fourth terminal 122 is configured to send a signal when a change in capacitance and/or resistance is detected. In alternative embodiments, component 100 includes any terminal that enables component 100 to function as described herein. In some embodiments, at least one of first terminal 116, second terminal 118, third terminal 120, and fourth terminal 122 is omitted.

Also, in the exemplary embodiment, a controller 130 is coupled to component 100. Controller 130 is configured to receive signals from at least one of first terminal 116, second terminal 118, third terminal 120, and fourth terminal 122 and determine a structural configuration of component 100 based on the signals. In the exemplary embodiment, controller 130 is configured to compare characteristics of component 100 (e.g., capacitance and/or resistance) and determine when component 100 has experienced a structural change. For example, in some materials, component 100 has a decrease in capacitance and an increase in resistance when component 100 experiences a structural change because the structural change at least partially disrupts current flow paths through structural members 102. In some embodiments, controller 130 is configured to receive signals relating to capacitance and/or resistance at regular intervals and determine structural changes based on any changes in capacitance and/or resistance over time. In further embodiments, controller 130 receives capacitance and/or resistance measurements when a change in capacitance and/or resistance is detected by sensor assembly 114.

Figure 2:
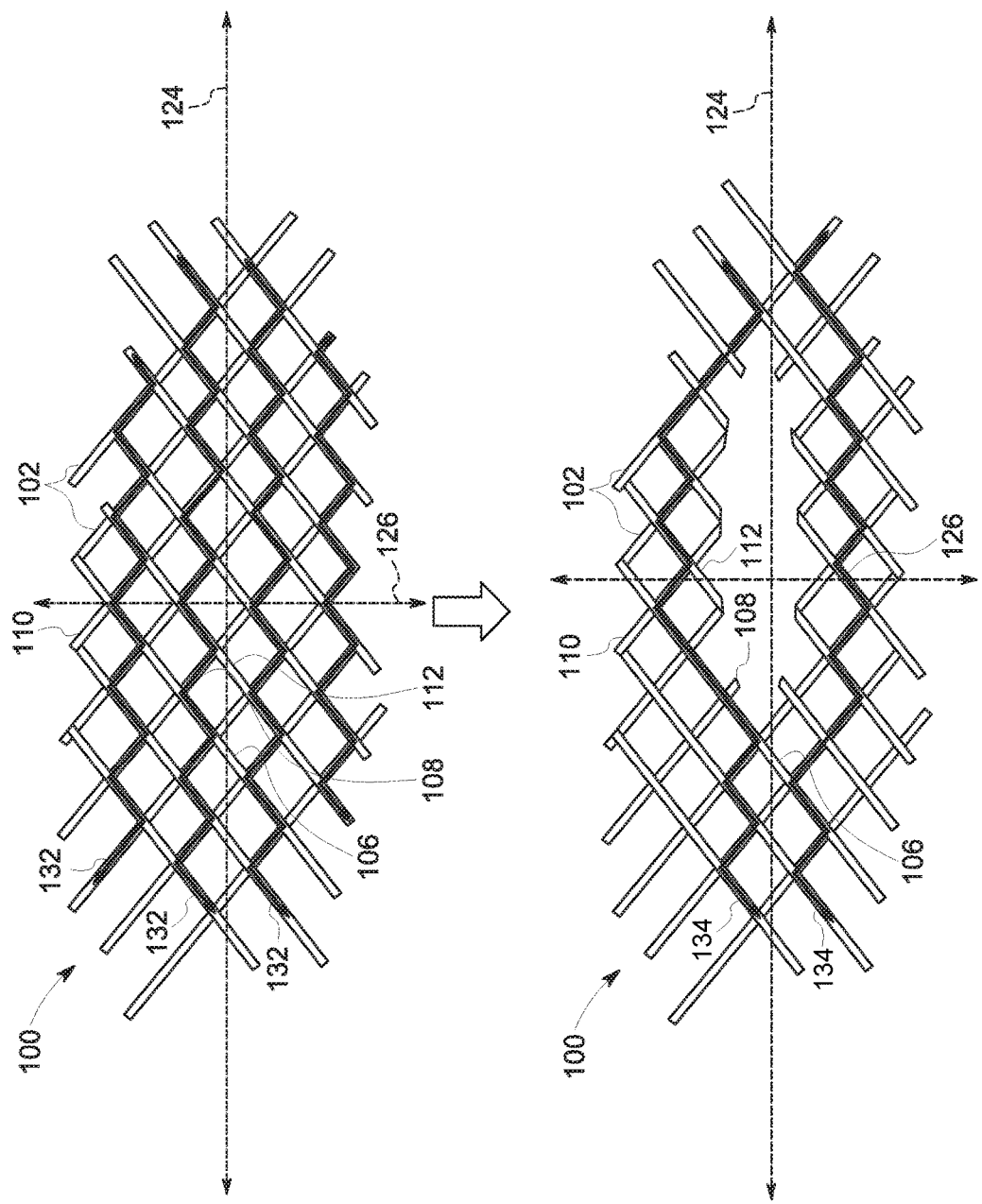
FIG. 2 is a schematic illustration of the component shown in FIG. 1 showing load paths through the component.

FIG. 2 is a schematic illustration of component 100 showing load paths through component 100. Structural members 102 define a plurality of load paths extending in different directions. Accordingly, structural members 102 enable component 100 to redistribute loads when a loading of component 100 changes. For example, component 100 defines a set of first load paths 132 and a set of second load paths 134. In some embodiments, loads are transferred along first load paths 132 longitudinally and/or transversely when component 100 is in a first structural configuration. Loads are transferred along second load paths 134 longitudinally and/or transversely in directions different from first load paths 134 when component 100 is in a second structural configuration. Accordingly, second load paths 134 allow loads to bypass some structural members 102 and reduce stress in component 100 when component 100 switches from the first structural configuration to the second structural configuration.

In the exemplary embodiment, first structural member 106, second structural member 108, and fourth structural member 112 are coupled in series and define at least one first load path 132. When component 100 is in the first structural configuration, a load is transferred along first load path 132 from first structural member 106 through second structural member 108 to fourth structural member 112. First structural member 106, third structural member 110, and fourth structural member 112 are coupled in series and define at least one second load path 134. When component 100 is in the second structural configuration, a load is transferred along second load path 134 from first structural member 106 through third structural member 110 to fourth structural member 112. Accordingly, second load path 134 allows a load to bypass second structural member 108 and facilitates redistribution of loads when at least one structural member 102, such as second structural member 108, is damaged and/or dislocated. In alternative embodiments, component 100 has any structural configuration that enables component 100 to operate as described herein.

In reference to FIGS. 1 and 2, a method of detecting a structural change in component 100 includes providing sensor assembly 114 and determining, using sensor assembly 114, a first characteristic along first load path 132 between first terminal 116 and second terminal 118. The method also includes determining, using sensor assembly 114, a second characteristic along second load path 134 between first terminal 116 and second terminal 118. In some embodiments, the method includes generating a signal when at least one of first terminal 116 and second terminal 118 detects the second characteristic along second load path 134.

Also, in some embodiments, the method includes comparing the first characteristic to the second characteristic and determining, using controller 130, a structural configuration of component 100 based on the first characteristic and the second characteristic. Accordingly, sensor assembly 114 facilitates the detection of structural changes in component 100.

Figure 3:
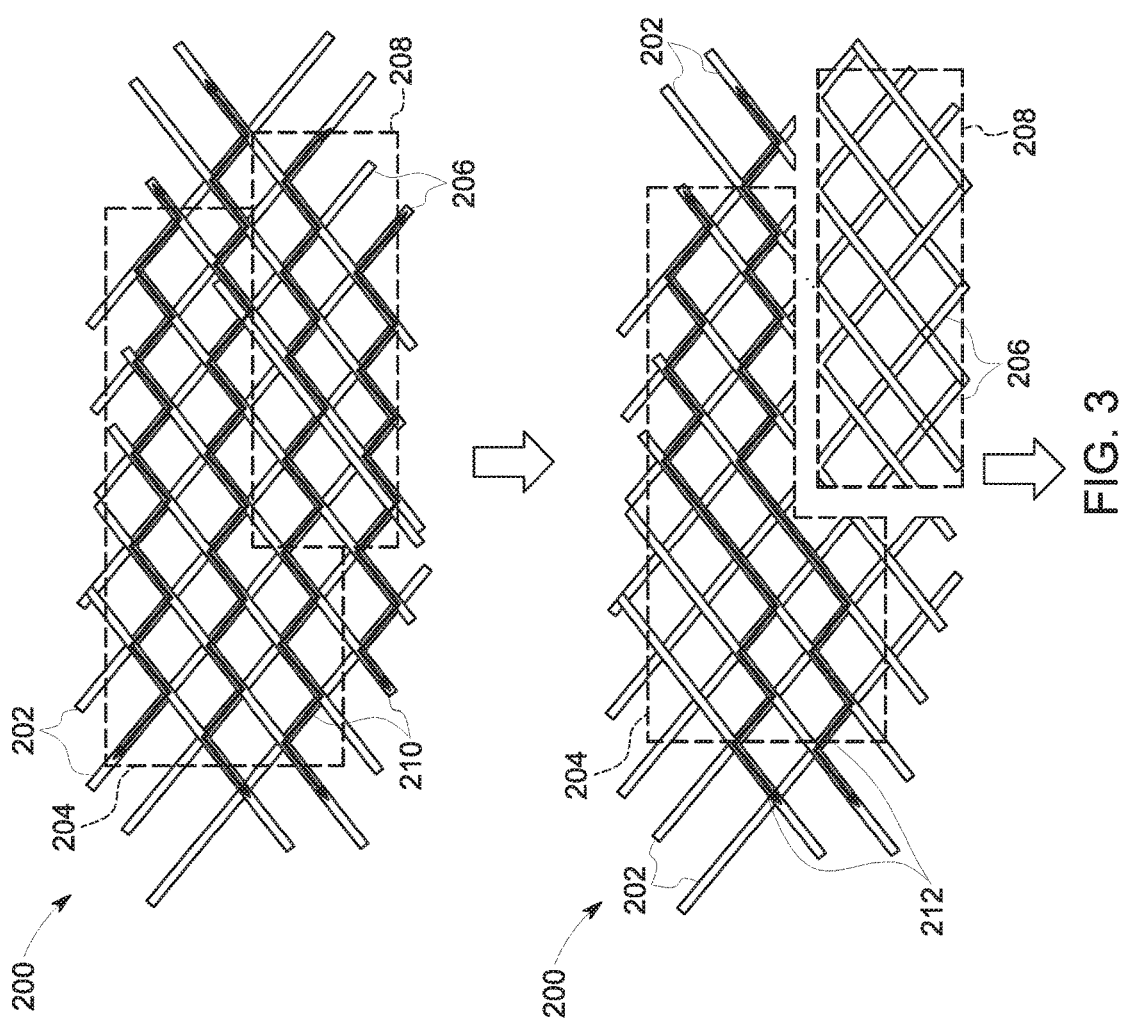
FIG. 3 is a schematic illustration of an exemplary component including a plurality of regions and showing load paths through the component.

FIG. 3 is a schematic illustration of an exemplary component 200 including a plurality of regions and showing load paths through component 200. Component 200 includes a set of first structural members 202 defining a first region 204 of component 200, and a second set of structural members 206 defining a second region 208 of component 200. Component 200 has a first structural configuration and a second structural configuration. Component 200 switches between the first structural configuration and the second structural configuration when component 200 experiences a structural change (e.g., when at least one structural member 206 of component 200 is dislocated and/or damaged). When component 200 is in the first structural configuration, second structural members 206 are coupled to first structural members 202. When component 200 is in the second structural configuration, at least some second structural members 206 are separated from first structural members 202 and second region 208 is at least partially separated from first region 204. In alternative embodiments, component 200 has any structural configuration that enables component 200 to operate as described herein. For example, in some embodiments, component 200 includes any number of regions.

Also, in the exemplary embodiment, component 200 defines first load paths 210 and second load paths 212. First load paths 210 extend through first region 204 and second region 208. Second load paths 212 extend through first region 204 and allow loads to bypass second region 208. In the exemplary embodiment, second region 208 and second load paths 212 enable component 200 to maintain structural entity when component 200 switches between the first structural configuration and the second structural configuration. For example, second load paths 212 enable component 200 to distribute loads through first region 204 when component 200 switches between the first structural configuration and the second structural configuration. In the exemplary embodiment, second region 208 is configured to completely separate from first region 204. In alternative embodiments, component 200 switches between the first structural configuration and the second structural configuration in any manner that enables component 200 to operate as described herein. For example, in some embodiments, second region 208 is not necessarily completely separated from first region 204 in the second structural configuration.

In addition, in some embodiments, first region 204 includes a first material and second region 208 includes a second material. In the exemplary embodiment, first region 204 includes a material that is stronger than second region 208 to facilitate second region 208 separating from first region 204 when component switches between the first structural configuration and the second structural configuration. In alternative embodiments, component 200 includes any material that enables component 200 to operate as described herein. For example, in some embodiments, component 200 includes an abradable material.

Figure 4:
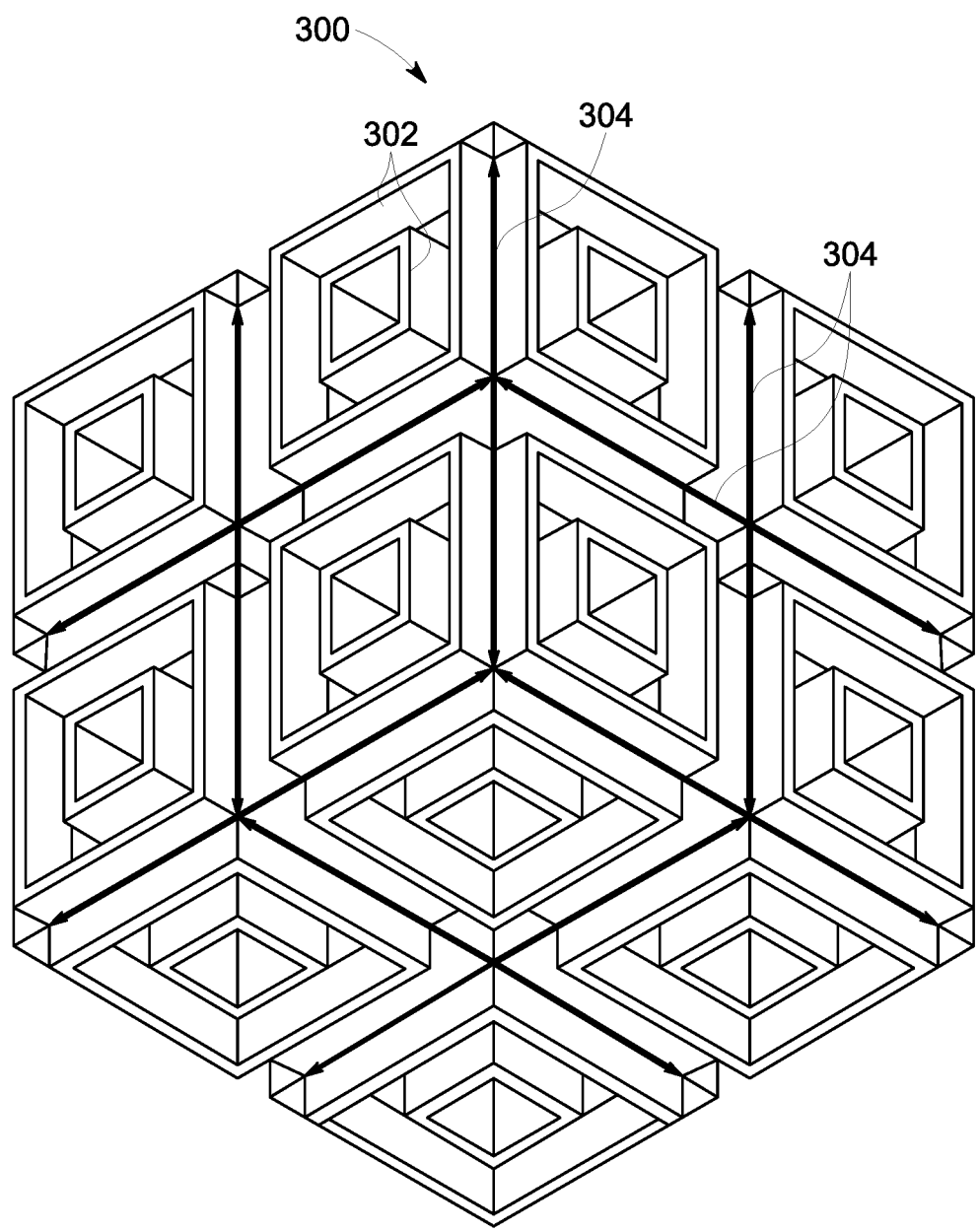
FIG. 4 is a schematic illustration of an exemplary component including a plurality of unit cells and showing load paths through the component.

FIG. 4 is a schematic illustration of a component 300 including a plurality of unit cells 302 and showing load paths 304 through component 300. Unit cells 302 are coupled together and form a repeating structure. Accordingly, unit cells 302 define a plurality of load paths 304. In addition, unit cells 302 have a nested configuration. As a result, component 300 provides a plurality of load paths 304 extending in different directions. Moreover, component 300 is configured to redistribute loads when component 300 experiences a structural change. In alternative embodiments, component 300 has any configuration that enables component 300 to operate as described herein.

In reference to FIGS. 1-4, in some embodiments, structural members 102, 202, 206, and unit cells 302 of respective components 100, 200, 300 are formed by an additive manufacturing process. Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Project, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

For example, the additive manufacturing process provides a broader range of design options and allows for integration of complex structural arrangements into components 100, 200, 300. Moreover, the additive manufacturing process reduces the cost to assemble components 100, 200, 300. In particular, the additive manufacturing process allows precise formation of structural members 102, 202, 206, and unit cells 302 and enables structural members 102, 202, 206, and unit cells 302 to interconnect and form multiple load paths.

The above-described methods and systems facilitate detection of structural changes to components and reduce the structural effects of such changes. For example, some embodiments include a component including a plurality of interconnected structural members that define a plurality of load paths through the component. The structural members enable loads to travel along the different load paths and bypass at least some structural members. As a result, the structural members facilitate the isolation of portions of the component when the component experiences structural changes. In addition, in some embodiments, the component is used as a sensor to detect structural changes. Moreover, in some embodiments, the structural members form at least one region that separates from the remainder of the component and allows the component to maintain structural integrity when the component experiences structural changes.

An exemplary technical effect of the methods, systems, and apparatus described herein includes at least one of (a) facilitating the detection of structural changes in a component; (b) providing components having redundant load paths to allow for load distribution after structural changes to the component; (c) reducing the cost to assemble and maintain components; (d) enabling isolation of portions of a component after structural changes to the component; (e) providing components having separable regions; (0 increasing the expected service life of components; and (g) enabling components to maintain structural integrity and provide at least a limited load carrying capacity after the components experience structural changes.

Exemplary embodiments of components and methods for operating systems are described above in detail. The systems and methods of operating such systems are not limited to the specific embodiments described herein, but rather, components of systems and/or steps of the methods may be utilized independently and separately from other components and/or steps described herein. For example, the components may also be used in combination with other structures, and are not limited to practice with only the turbomachines and methods as described herein. Rather, the exemplary embodiment can be implemented and utilized in connection with many other applications requiring components.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A component having a first structural configuration and a second structural configuration, said component comprising:
    a sensor assembly including a plurality of interconnected structural members defining a plurality of load paths, said plurality of interconnected structural members comprising:
        a first structural member partly defining a first region;
        a second structural member coupled to said first structural member and at least partly defining a second region, wherein said first structural member and said second structural member define a first load path when said component is in the first structural configuration, wherein, in the first structural configuration, said first structural member and said second structural member are coupled together in a series such that a first portion of the first load path extends longitudinally through said first structural member and a second portion of the first load path extends longitudinally through said second structural member, and wherein said second region is separated from said first region in the second structural configuration; and
        a third structural member coupled to said first structural member and partly defining said first region, wherein said first structural member and said third structural member define a second load path when said component is in the second structural configuration, and wherein the second load path is configured to bypass said second structural member, wherein said first structural member and said third structural member are coupled together in a series such that a first portion of the second load path extends longitudinally through said first structural member and a second portion of the second load path extends longitudinally through said third structural member in the second structural configuration,
    wherein said sensor assembly is configured to detect a characteristic of said component that changes when said component switches between the first structural configuration and the second structural configuration.

2. The component in accordance with claim 1, wherein said sensor assembly comprises at least one terminal coupled to said plurality of interconnected structural members, and wherein said at least one terminal is configured to provide an electrical current to said plurality of interconnected structural members to facilitate detection of the characteristic.

3. The component in accordance with claim 2, wherein said at least one terminal is configured to transmit a signal to a controller configured to determine whether said component is in the first structural configuration or the second structural configuration based on the signal.

4. The component in accordance with claim 2, wherein said sensor assembly is configured to detect at least one of a capacitance and a resistance of said component.

5. The component in accordance with claim 1, wherein said component is incorporated into at least one of a turbomachine, a wind turbine, and an airfoil.

6. The component in accordance with claim 1, wherein said plurality of interconnected structural members form at least one of a lattice structure and a nested unit cell structure.

7. The component in accordance with claim 1, wherein said sensor assembly further comprises a first terminal and a second terminal spaced from said first terminal, and wherein said first terminal and said second terminal are configured to detect the characteristic along load paths extending in a first direction.

8. The component in accordance with claim 7, wherein said sensor assembly further comprises a third terminal and a fourth terminal spaced from said third terminal, and wherein said third terminal and said fourth terminal are configured to detect the characteristic along load paths extending in a second direction different from the first direction.

9. The component in accordance with claim 1, wherein said plurality of interconnected structural members further comprises a fourth structural member coupled to said second structural member and said third structural member, wherein the first load path and the second load path extend from said first structural member to said fourth structural member.

10. The component in accordance with claim 1, wherein said component is formed using an additive manufacturing process.

11. A method of detecting a structural change in a component, the component including a plurality of interconnected structural members defining a plurality of load paths, said method comprising:
    providing a sensor assembly including the plurality of interconnected structural members, a first terminal coupled to the plurality of interconnected structural members, and a second terminal coupled to the plurality of interconnected structural members, wherein the second terminal is spaced from the first terminal, the plurality of interconnected structural members defining a first region and a second region, wherein the sensor assembly has a first configuration in which the first region is coupled to the second region and a second configuration in which the second region is separated from the first region;

directing an electrical current through the component between the first terminal and the second terminal;

determining, using the sensor assembly, a first characteristic along a first load path between the first terminal and the second terminal, wherein at least one structural member of the plurality of interconnected structural members at least partially defines the first load path, wherein the interconnected structural members are coupled in series such that the first load path extends longitudinally through the at least one structural member; and determining, using the sensor assembly, a second characteristic along a second load path between the first terminal and the second terminal, wherein the second load path allows a load to bypass the at least one structural member of the plurality of interconnected structural members in the second configuration of the sensor assembly, wherein the second load path extends longitudinally through another structural member of the plurality of interconnected structural members.

12. The method in accordance with claim 11 further comprising generating a signal based on the determination of the second characteristic along the second load path.

13. The method in accordance with claim 11, wherein providing the sensor assembly comprises providing a sensor assembly including a third terminal coupled to the plurality of interconnected structural members and spaced from the first terminal and the second terminal.

14. The method in accordance with claim 11 further comprising:

comparing, using a controller, the first characteristic to the second characteristic; and determining, using the controller, a structural configuration of the component based on the first characteristic and the second characteristic.

15. The method in accordance with claim 11 further comprising detecting the first characteristic using at least one of the first terminal and the second terminal.

16. The method in accordance with claim 11, wherein providing the sensor assembly including the plurality of interconnected structural members comprises providing a plurality of interconnected structural members formed using an additive manufacturing process.

17. A component comprising:

a sensor assembly including a plurality of interconnected structural members defining a plurality of load paths, said plurality of interconnected structural members comprising:

a first set of structural members defining a first region of said component; and a second set of structural members defining a second region of said component, wherein said component has a first structural configuration in which said second set of structural members are coupled to said first set of structural members, and a second structural configuration in which said second region is at least partially separated from said first region, wherein said first set of structural members and said second set of structural members define a first load path when said component is in the first structural configuration, and wherein said first set of structural members define a second load path when said component is in the second structural configuration, wherein the second load path is configured to allow a structural load to bypass said second region, wherein, in the first structural configuration, said first set of structural members and said second set of structural members are coupled together in a series such that the first load path extends longitudinally through said first set of structural members and said second set of structural members, and wherein said first set of structural members are coupled together in a series such that the first load path extends longitudinally through said first set of structural members in the second structural configuration.

18. The component in accordance with claim 17, wherein said first region includes a first material and said second region includes a second material different from the first material.

19. The component in accordance with claim 17, wherein said first set of structural members form at least one of a lattice structure and a nested unit cell structure.

20. The component in accordance with claim 17, wherein said component is incorporated into at least one of a turbomachine, a wind turbine, and an airfoil.

21. The component in accordance with claim 17, wherein said second set of structural members includes a plurality of interconnected structural members.

22. The component in accordance with claim 17, wherein said second region is configured to completely separate from said first region when said component is in the second structural configuration.

23. The component in accordance with claim 17, wherein said component is formed using an additive manufacturing process.

* * * * *